(12) United States Patent
Hunt et al.

(10) Patent No.: US 7,031,136 B2
(45) Date of Patent: Apr. 18, 2006

(54) VARIABLE CAPACITORS, COMPOSITE MATERIALS

(75) Inventors: Andrew Tye Hunt, Atlanta, GA (US); Miodrag Oljaca, Avondale Estates, GA (US); Scott Flanagan, Atlanta, GA (US); Girish Deshpande, Norcross, GA (US); Stein Lee, Atlanta, GA (US); Peter W. Faguy, Suwanee, GA (US)

(73) Assignee: nGimat Co., Atlanta, GA (US)

( * ) Notice: Subject to any disclaimer, the term of this patent is extended or adjusted under 35 U.S.C. 154(b) by 105 days.

(21) Appl. No.: 10/474,741

(22) PCT Filed: Apr. 9, 2002

(86) PCT No.: PCT/US02/11133

§ 371 (c)(1),
(2), (4) Date: Oct. 9, 2003

(87) PCT Pub. No.: WO03/088358

PCT Pub. Date: Oct. 23, 2003

(65) Prior Publication Data

US 2004/0169992 A1   Sep. 2, 2004

(51) Int. Cl.
*H01G 5/00* (2006.01)

(52) U.S. Cl. .................. 361/277; 361/272; 361/278; 361/281; 361/283; 361/290

(58) Field of Classification Search ............... 361/277, 361/272, 278, 281–282, 283.1, 290–293, 361/283, 298.2
See application file for complete search history.

(56) References Cited

U.S. PATENT DOCUMENTS

| | | | | | |
|---|---|---|---|---|---|
| 4,080,590 A | * | 3/1978 | Pricer | .......................... | 365/149 |
| 4,510,516 A | * | 4/1985 | Bartelink | ..................... | 257/296 |
| 5,800,575 A | * | 9/1998 | Lucas | ........................ | 29/25.42 |
| 6,229,684 B1 | * | 5/2001 | Cowen et al. | ............. | 361/278 |
| 6,587,326 B1 | * | 7/2003 | Depetro et al. | ............. | 361/277 |
| 6,625,004 B1 | * | 9/2003 | Musolf et al. | ............. | 361/278 |
| 6,922,327 B1 | * | 7/2005 | Chua et al. | ................. | 361/278 |

* cited by examiner

*Primary Examiner*—Nguyen T. Ha
(74) *Attorney, Agent, or Firm*—Alfred H. Muratori; Wayne E. Nacker

(57) ABSTRACT

Tunable capacitors (10, 20, 30, 40) have a dielectric material (16, 26, 36, 42) between electrodes, which dielectric material comprises an insulating material (17, 27, 37, 42) and electrically conductive material, (18, 28, 38, 48) e.g., conductive nanoparticulates, dispersed therein. In certain cases, enhanced tune-ability is achieved when the dielectric material comprises elongated nanoparticulates (38). Further enhanced tune-ability may be achieved by aligning elongated particulates in an electrode-to-electrode direction. Nanoparticulates may be produced by heating passivated nanoparticulates. Passivated nanoparticulates may be covalently bound within a polymeric matrix. High bias potential device structures can be formed with preferential mobilities.

19 Claims, 1 Drawing Sheet

VARIABLE CAPACITORS, COMPOSITE MATERIALS

The present invention is directed to capacitors that can be tuned by a biasing voltage. The present invention is also directed to novel particulates and composite materials that are useful for forming tunable capacitors.

BACKGROUND OF THE INVENTION

One of the issues with variable capacitor materials, dielectrics—whose dielectric permittivities change when a electric bias is applied, is that these materials must be crystalline. These materials have a perovskite structure. Many of these tunable materials have higher losses than are desired, which lowers the performance of the functional devices.

In addition, these materials have large temperature coefficients of capacitance. Therefore, it is hard to keep a constant capacitance without also knowing the temperature of the system. Monitoring and feedback loops are commonly required to compensate for changes in capacitance with temperature. Therefore, decreasing the effective overall change in capacitance can eliminate the need for a compensating circuit.

Further, these materials experience upper limits in response to frequency somewhere in the 15–45 GHz range. Depending on the material, responsiveness of the material decreases at higher frequencies.

The crystalline nature of these materials depends on deposition parameters (temperature, etc.) and substrate properties. It is important that the crystalline nature of the material is optimized to increase performance. Also, boundaries can lead to loss and leakage in the capacitance structures or RF signal and lower the amount of material that experiences the dielectric change.

The scope of the current invention enables materials to be formed that have a significantly reduced temperature coefficient of capacitance and can be put on a wide range of substrates using a wide range of processes. The invention is keyed around a composite of materials or a structure of materials where a wide range of conductive and non-conductive materials can be formed in a variety of ways to yield the desired functional capacitors. By using materials with both negative and positive temperature coefficients of capacitance, it is envisioned that an overall temperature coefficient of capacitance approaching zero can be achieved. These materials could also have utilization in the area of optics.

Composite materials formed of dielectric material containing embedded particulates of conducting material have been shown to have high dielectric values.

It has been shown in the past that by forming a nano-laminate of silica and platinum, a higher value of capacitance can be achieved with respect to pure silica. The enhanced capacitance is due to the formation of dipoles within the thin platinum layers. The free electrons from the platinum are able to act as dipoles between the electrodes; thus, adding to the capacitance of the structure. In a similar way, by having nano-laminates and/or nano-clusters or particulates of a conductive material in a matrix of an insulator material, the capacitor can be enhanced. This is achieved by the additional charge separation possible in the isolated conductive layers or particulates, which enables a higher capacitance on the electrodes on either side of the material.

SUMMARY OF THE INVENTION

Herein it is found that capacitors having dielectric material layers in which isolated conductive or semi-conductive material domains are contained within dielectric or insulating material can be biased with DC current or low frequency AC current in a direction perpendicular to the capacitive electrical pathway (in a capacitor plate-to-capacitor plate direction) so as to vary the capacitance of the capacitor. The invention provides for variable capacitors utilizing such composites as the dielectric material layer. Hereinafter, the term "conductive particulates" is used broadly to encompass particulates of materials that are semi-conductive as well as conductive and which enhance dielectric constant and tunability in accordance with the invention.

It is desirable for purposes of maximizing dielectric value of the dielectric material that a high loading of very small conductive particulates be loaded into an insulating substrate. The loading cannot be so high, however, that the conductive particulates form conductive pathways through the dielectric material layer (unless electrical insulative layers are provided). Also, the particulates can be nanomaterials but should be sufficiently large and/or elongated that meaningful dipoles in the conducting material particulates will be produced by an electric field.

The invention is further directed to methods of producing nanoparticulates of conducting material that may be used in dielectric material layers of variable capacitors.

The invention is further directed to novel compositions in which conducting material particulates or domains are distributed throughout a dielectric or insulating material.

The invention is further directed to methods of forming these materials, the use of such materials not being limited to specific uses discussed herein.

DETAILED DESCRIPTION OF CERTAIN PREFERRED EMBODIMENTS

Figure 1:
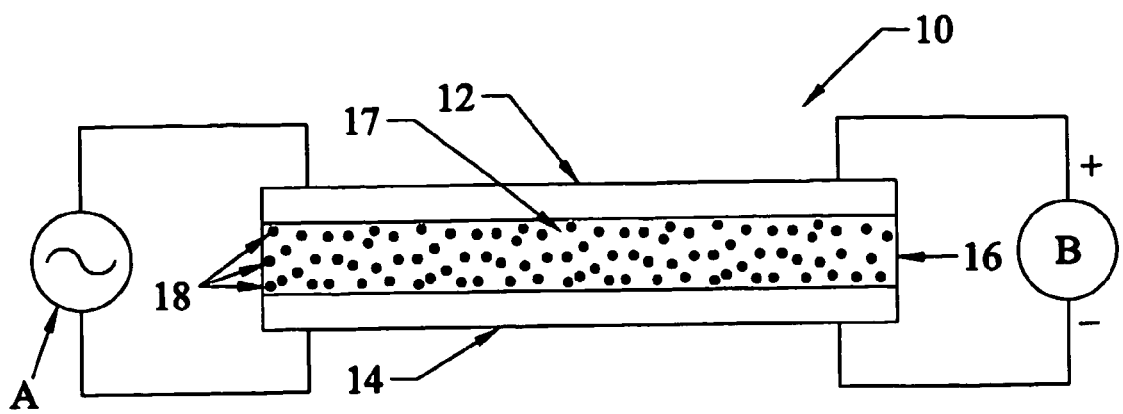
FIG. 1 illustrates a first embodiment of a variable capacitor according to the present invention.

In FIG. 1, a capacitor 10 is shown having a first electrode 12, a second electrode 14, and a dielectric 16 between the electrodes. Dielectric 16 is formed of a matrix material 17 and a plurality of conductive particulates 18 suspended in the matrix material 17. The conductive particulates 18 not only provide dielectric 16 with a high dielectric constant, but also results in a tunable dielectric. By applying a DC or low frequency AC signal (from biasing source B) between electrodes 12 and 14, the dielectric constant is increased, resulting in a change in capacitance at RF frequencies, thereby providing a tuning element for RF circuits A. While the RF circuits A and the biasing B circuits are shown as being connected separately, they may of course be attached to the capacitor electrodes via the same connections or wire traces.

Figure 2:
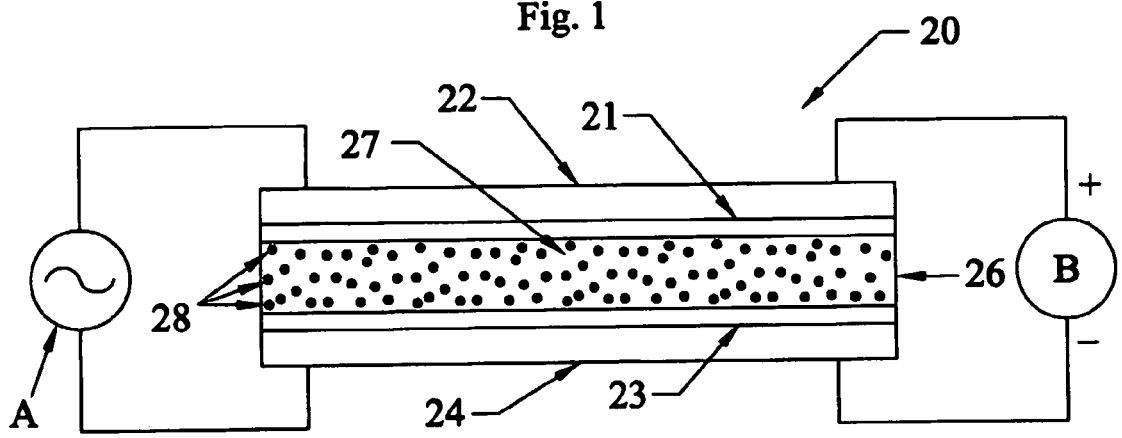
FIG. 2 illustrates a second embodiment of a variable capacitor.

The capacitor 20 shown in FIG. 2, is similar to capacitor 10, in that it is formed of a first electrode 22, a second electrode 24, and a dielectric 26 between the electrodes. Dielectric 26 is also formed of a matrix material 27 and a plurality of conductive particulates 28 suspended in the matrix material 27. In addition capacitor 20 includes a first electrically insulating layer 21 and a second electrically insulating layer 23. The insulating layers 21 and 23 allow increased loading of the conductive particulates 28. As the loading is increased, the conductivity of the dielectric 26 increases, leading to increased leakage current, and loss. The insulating layers 21 and 23 obviate this problem by eliminating the path for leakage current, while still allowing high loadings.

As described above, the high dielectric materials of the present invention comprise a matrix of a dielectric or insulating material having multiple domains of an electrically conductive material, which domains, in the presence of an electrical field form dipoles. These dipoles enhance the dielectric value of the layer and increase the capacitance of the capacitor when a charge is placed across the dielectric layer through the capacitor plates. The strength and direction of the dipoles can be altered by a biasing electrical field, either DC or low frequency AC exerted in a direction perpendicular to the capacitive electrical pathway between the capacitor plates. Thus, capacitors using dielectric materials of the present invention are tunable, an important feature for use in radio frequency (RF) devices as well as other electronic devices.

So that a large number of dipoles can be produced in the dielectric layer, it is desired that the conducting particulate domains be very small, whereby a very large number of such domains may be contained within a dielectric material matrix without forming a conductive pathway. At the same time, these domains must be large enough that effective dipoles are produced. Generally, the domains have mean particulate diameters of between about 5 and about 500 nanometers.

Nanoparticulates of the present invention may be produced by a variety of processes. One simple method of producing dielectric materials of the present invention is to merely produce nanoparticulates and, in some manner, incorporate the nanoparticulates in a dielectric material. Nanoparticulates of conducting material, e.g., metals or conductive oxides, may be produced inexpensively by combustion chemical vapor deposition (CCVD) techniques, such as are described in U.S. Pat. Nos. 5,652,021 and 6,132,653. By these methods, nanoparticulates of non-reactive metals, such as platinum, palladium and gold, are easily produced, as are a wide variety of oxides, including conductive oxides. More reactive metals, such as nanoparticulates of copper, cobalt and nickel, may be produced by CCVD using a reducing flame.

Nanoparticulates may easily be incorporated by dispersing them in a liquid polymer or liquid polymer solution and forming a film of the polymer by drying a solution, melting the polymer and dispersing the molten polymer as a layer, or providing a cross-linker for a cross-linkable polymer. The polymer may be selected from any of a wide variety of polymers, both thermoplastic and thermosetting. The selection of a particular polymer will depend upon a number of factors, such as dielectric constant of the polymer, mechanical stability and heat stability of the polymer, and, in some cases, flexibility of the polymer. For electrical applications, epoxies, polyimides, polyamide/imides, polytetrafluoroethylene, and liquid crystal polymers are particularly suitable.

Patent Cooperation Treaty patent application published as WO 02/02320 A1 describes deposition of finely divided particulates of polymers to form a film. The film may contain particulate material, either particulates suspended in the film-forming polymer solution, or formed by CCVD. The techniques taught in this patent application may be used to form a dielectric film with a polymer matrix in which are dispersed conducting particulates.

Related Patent Cooperation Treaty patent application published as WO 02/02246 A1 describes similar techniques for co-depositing dielectric inorganic materials, such as silica, alumina, ceria etc. along with particulates that become distributed throughout the layer that is formed. Metal particulates, such as platinum nanoparticulates, co-deposited with dielectric material, such as silica, provide suitable high dielectric materials for use in tunable capacitors in accordance with the present invention.

In accordance with one aspect of the invention, metal nanoparticulates, including metal nanocrystals, are produced by heating solutions of organic passivated metal nanoparticulates, including organic passivated metal nanocrystals.

Herein, compounds in which metal nanoparticulates, including nanocrystals, are surface-passivated with organic moieties will be referred to Organic-Passivated Metal Nanocrystals or "OPMNC"s. Particulates of this type in which the metal cannot be truly called a crystal are referred to herein as "nanoparticulates". OPMNCs have the property of being soluble in organic solvents, such as hydrocarbon solvents, e.g., toluene, to form stable solutions. Such solutions may contain additional organometallic compounds. If the organic moieties are polar, they may be soluble in polar solvents, such as water.

The metal portion of the OPMNC may range in size from 1 nanometer to 500 nanometers, generally from 5 to 100 nanometers. Upon decomposition, the particulates initially formed are of these size ranges, although, depending upon conditions, the nanoparticulates may agglomerate into clusters or thin films.

OPMNCs in accordance with the present invention have the general formula:

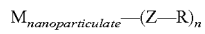

$$M_{nanoparticulate}\text{—}(Z\text{—}R)_n$$

wherein $M_{nanoparticulate}$ is a nanoparticle of an elemental metal selected from the group consisting of gold, silver, copper, nickel, palladium, platinum, and cobalt; Z is sulfur or oxygen, preferably sulfur, R is an organic moiety that promotes solubility of the OPMNC in an organic solvent, and n is a number sufficient for passivation of said metal nanoparticulate. Most commonly, R is an alkyl group having from about 1 to about 30 carbons, more preferably from about 8 to about 20 carbons, and most preferably from about 12 to about 18 carbons generally straight-chain alkyl group, such as laurel. Alkyl groups promote solubility of the OPMNC in hydrocarbon solvents, such as toluene. Other R groups may be used to promote solubility in other solvents or to provide functionality for other purposes. R groups for hydrophobic solvents in addition to straight chain alkyl include branched-chain alkyl, alkenyl, aryl, arylalkyl, alkylaryl, halogenated derivatives thereof, and alkynyl. R groups for hydrophilic solvents include, but are not limited to alcohols, polyols, phenols, ethers, carboxylic acids, amines, sulfonates, and phosphates.

In accordance with one aspect of the invention, solutions of OPMNCs are heated in a reducing atmosphere to a temperature where the OPMNCs decompose, releasing the metal monoparticulates free of the surface passivating groups (—Z—R). The elemental metals are released initially as monoparticulates. If deposited on a substrate, the metal particulates remain as monoparticulates, form small clusters of such nanoparticulates, or agglomerate. If thin films are formed, the nanoparticulates may sinter together, e.g., at room temperature in the case of soft metals such as gold or with the application of heat to the substrate, whereby the monoparticulate nature of the particulates may be lost. Mixtures of OPMNCs (different metals) may be co-deposited to form alloys, or OPMNCs may be decomposed in the presence of other dissolved metal precursors, such as platinum precursors, to form alloys.

There are a variety of uses for elemental metal nanoparticulates formed in accordance with the present invention and for the materials, such as small clusters or thin films formed therefrom.

Thin films of nanoparticulate metal deposited in accordance with the present invention, either as single element metal or alloyed with co-deposited metal, may have a variety of uses as well. Conforming gold thin film layers may be deposited in accordance with the present invention which may be highly reflective. Such thin films may be used for electrical conduction or may serve an ornamental purpose. Deposited films, particularly gold and silver, that are highly reflective are useful in optical devices, such as mirrors.

Nanoparticulates of metals, such as nanoparticulates of gold or palladium may exhibit catalytic activity, as may small clusters of such nanoparticulates. Nanoparticulates of metals such as gold may be used to alter the catalytic activity of co-deposited metals, such as platinum. For example, platinum particulates are known to be useful as catalytic material in membranes of fuel cells, but platinum particulates are particularly susceptible to being poisoned by carbon monoxide. Co-deposition in accordance with the invention of gold and platinum may produce catalytic particulates with substantially reduced susceptibility to being poisoned by carbon monoxide.

It is known to use platinum thin films as conductive and resistive elements; however, platinum thin films have higher coefficients of thermal resistance (CTR) than may be desired. Modification of platinum thin films with co-deposited gold in accordance with the present invention reduces the CTR of such thin films.

Thin films of copper, nickel, and other conductors may be used to form patterned electronic circuitry. Conductors may be deposited as very thin layers by the method of the present invention and patterned by known photolithographic techniques to form circuitry trace patterns of very fine resolution. Subsequently, electroplating or electroless plating may be used to build up the thickness of such circuitry traces.

To release the metal nanoparticulates from the OPMNCs, heat is applied. Thioalkyl groups are released from gold nanoparticulates at about 270° C. Other OPMNCs have different decomposition temperatures. So that the elemental metal does not oxidatively react with other materials, such as oxygen, halides, phosphorous, etc., the decomposition is effected in a reducing atmosphere.

One way of providing the heat is by simply burning the solution in a reducing flame as described, for example in U.S. patent and applications describing combustion chemical vapor deposition (CCVD), e.g., U.S. Pat. No. 5,652,021 and U.S. patent application Ser. No. 09/067,975, the teachings of each of which are incorporated herein by reference. The solvent, e.g., toluene, provides the fuel to the flame that produces the decomposition heat. Oxygen to the flame is limited so as to provide reducing conditions in the flame.

Other means of heating may be used, such as admixing with heated inert gas, such as nitrogen, or reducing gas, such as hydrogen. Or means, such as resistive heating, inductive heating, etc. may be employed to decompose the OPMNC.

The solution of OPMNC may contain a mixture of OPMNCs, such as gold-containing and silver-containing OPMNCs. Or a precursor of another metal, such as platinum, may be co-dissolved in the solution. Precursors of platinum which may be co-dissolved in solution include platinum (II) acetylacetonate and platinum (II) 2-ethylhexanoate.

Au/Pt alloys deposited in accordance with the present invention have particular utilities as catalytic agents and as electrically resistive thin films. Such alloys may range from 1:99 to 99:1 Au:Pt by weight. The invention provides such alloys with the co-deposited elemental metals intimately mixed with very uniform composition. When a thin film of nanoparticulates is deposited on a substrate, some metals, such as gold, will naturally sinter together the nanoparticulates. For other metals heat is applied to the substrate if sintering is desired. Other precious metal alloys in similar weight ratios may also be expected to exhibit unique catalytic properties.

Rather than heat-treat passivated nanoparticulates to free the metal nanoparticulates or nanocrystals from their organic shells, the passivated nanoparticulates can themselves be used to provide the conductive material domains in dielectric material layers of the present invention. Generally, the organic moieties of the shell are electrically insulating; accordingly, the shells not only ensure that the metal domains of adjacent passivated nanoparticulates are spatially separated, but also ensure that they are electrically isolated. Accordingly, the use of such passivated nanoparticulates ensures that conductive pathways do not form through a dielectric material layer. Such passivated nanoparticulates may be merely dispersed in a dielectric material, such as an electrically insulating polymer and/or dielectric inorganics, and used to form a dielectric film.

The use of passivated nanoparticulates is particularly advantageous relative to isolated metal particulates when the metal is chemically active. An important conductive material for use in the present invention is copper. Copper nanoparticulates and nanocrystals may readily be passivated through linkage by oxygen molecules to organic moieties. Because the surface metal atoms of such passivated nanoparticulates are either already reacted or sterically hindered from further reaction, the inner, non-reacted atoms of the particulates are protected from further chemical reaction, particularly oxidation. Accordingly, passivated nanoparticulates as the conducting particulates in dielectric materials of the present invention provide long-term chemical stability.

During use of a capacitor containing conductive material, e.g., metal, domains may form; the domains are repeatedly subjected to electrical forces. There may be a tendency for the domains to migrate toward or away from the capacitor plates, depending upon the mobility allowed by the dielectric material matrix. One way to prevent migration is to chemically solidify the conductive material domains in the dielectric matrix. The organic moiety of a passivated nanoparticulate may be selected as having reactive chemical moieties that bind to components of the dielectric material matrix. So that such moieties may be reactive without regard to steric effects, it is generally desirable that such reactive moieties be spaced from the metal nanoparticulate by 8 carbon atoms, preferably the spacing is 8–20 carbon atoms, more preferably 9–12 carbon atoms, although this will depend upon the particular chemical reaction contemplated to bind the nanoparticulate to the dielectric material.

The organic moiety of a passivated nanoparticulate may contain a chemical group that allows the nanoparticulate to be incorporated as an integral part of a polymer chain. For example, if the terminal group is an acrylic, a polyacrylate may be formed using the passivated nanoparticulate along with acrylic monomers. Terminal carboxylic acid groups may link with polyols to form polyesters with incorporated metal particulate domains. Terminal amine groups may link with polycarboxylic acids to form polyamides with metal particulate domains. In this regard, a wide range of chemistries may be envisioned to incorporate metal nanoparticulates of passivated nanoparticulates within a polymer chain.

Likewise, the passivated amine having active chemical groups in the organic moiety shell may be used to cross-link thermosetting resins, e.g., amine groups on the passivated nanoparticulates may be used to cross-link epoxy resins through the passivated nanoparticulates.

Covalent chemical bonding of passivated nanoparticulates into a polymer matrix may not always be necessary to hold the particulates in place. Polymer/passivated nanoparticulate linkages may be via secondary bonds, such as hydrogen bonds or Van Der Waals interactions. The passivated nanoparticulate can be enmeshed within a polymer matrix, there the polymer can be either a thermoset or a thermoplastic polymer. In thermoset polymers, the degree of cross linking plays a role in physically restraining the encapsulated particulates. In thermoplastic polymers, the softening temperature plays a role in embedding nanoparticulates.

The dielectrics for tunable capacitors could include one or more of the following: oxides, polymers, nonconductive non-oxide ceramics, air, pores or voids. The conductive particulate materials can range from various metals to conductive oxides to semiconductors. The key being that these "conductive" materials predominately have some amount of mobile electrons available that can respond to a voltage potential applied across the capacitor arrangement.

To further enhance tunability, the dielectric itself may be tunable. For example, ferroelectric dielectric materials, e.g., barium strontium titanate (BST) may be used as the dielectric for a dielectric/conductive particulate composite.

Nanoparticulates may be dispersed in a polymer emulsion, screen printed or sprayed onto a surface to form the dielectric with electrodes on either side. Similarly, there could be a suspension of conductor and dielectric materials sprayed on a surface and then treated to form a desired final material through drying or heating processes. Combustion chemical vapor deposition (CCVD) could be used to co-deposit the materials as a nano-composite or as alternating layers in a capacitor structure. The electrodes could be positioned in different ways. The DC bias could be applied at the same electrode as the higher frequency or RF signal or they could be in alternate directions depending on the desired effects. The freedom of electrodes and electrode placement can be enhanced as per Patent Cooperation Treaty Patent Application PCT/US01/26491 filed 23 Aug. 2001.

The following is a list of some of the materials that can be used as conductive and dielectric material in tunable capacitors in accordance with the invention. This list is exemplary and should not be deemed as limiting.

| Dielectrics: | Conductors: |
| --- | --- |
| Silica | Pt, Au, Ag, Cu + other metals |
| $TiO_2$ | LSCO |
| BST | TiN |
| MgO | $SrRuO_3$ |
| Epoxy | $RuO_2$ |
| Polyimide | YBCO |
| $Al_2O_3$ | Indium tin oxide |

-continued

| Dielectrics: | Conductors: |
| --- | --- |
| $Ta_2O_5$ | doped ZnO |
| Oxides | $LaNiO_3$ |
| Polymers | Si |
| AlN | conductive polymers |
| SiC | |
| $AlO_xN_y$ | |
| other non-oxide ceramics | |

A variety of other conductive compounds, including other conductive oxides other than those listed may be used, as may a variety of semi-conductive materials in addition to silicon. Conductivity of materials can be attributed to two material properties, charge carrier mobility and number of charge carriers. The number of charge carriers is the number of electrons or holes that the material provides for carrying charge through the material. The mobility, is the velocity of the charge carriers per electric field applied to the charge carrier. For RF and microwave signals, however, the mobility of the charge carriers has a greater effect on the electrical properties at these frequencies. The better the conductivity, the lower the loss. Thus for the conductive particulates in the composite, higher mobilities are desired. For the composite dielectric effect, it is desired that the conductor have mobilities of than $10^4$ $cm^2/V \cdot s$ or greater, preferably $10^6$ $cm^2/V \cdot s$ or greater.

The manner of capacitor tuning is important and low tuning voltages are desired, i.e., 40 volts or less, preferably 10 volts or less, and more preferably 3 volts are less. A manner of achieving low voltage tuning is described in a PCT application no. PCT/US01/26491, publication no. WO02/16973A2. In considering the DC or low frequency AC biasing signal applied to the capacitor, the mobility has little effect, because these low frequency signals do not require a quick response to the forces exerted by their electric field (the field is the voltage applied divided by the distance between the capacitor plates), as this field is changing at a slow rate (or no change for DC signals). While a significant number of charge carriers may be present in a material, if the mobility of those charge carriers is extremely low, the RF signal when applied to the capacitor plates, creates an electric field that changes too quickly to affect the charge carriers. Thus the conductive bias electrodes can enhance the DC field that changes the dielectric constant of the overall tunable dielectric composite material, while remaining transparent to the RF field. This is particularly important in considering intermodulation distortion (IMD), which occurs in conventional tunable materials when the electric field produced by the RF signal acts to (unintentionally and undesirably) tune the dielectric material. If the charge carriers are to slow to react to the RF field, they are not significantly affected by the RF field in the way they are affected by the DC or low frequency AC biasing field.

For purposes of the invention, it may be advantageous non-RF-interacting bias electrodes be made of materials that have electron/hole mobilities of about $10^3$ $cm^2/V \cdot s$ or less, preferably of about $10^{-1}$ $cm^2/V \cdot s$ or less.

The following materials have low mobilities:

| Material | Electron/Hole Mobility (cm²/V · s) |
|---|---|
| ZnO | 180 |
| EuO | 20–30 |
| LaMnO3 | 0.0002 |

Other materials having low mobilities but average or high conductivities can be found by consulting a reference guide such as Semiconductors—Basic Data, 2$^{nd}$ edition, Otfried Madelung (editor), published 1996.

Figure 3:
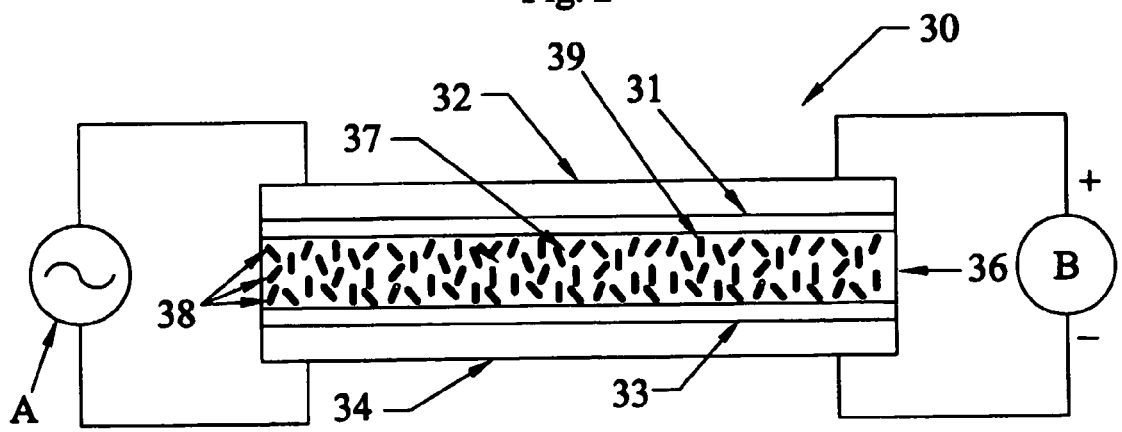
FIG. 3 illustrates a third embodiment of a variable capacitor.

The dielectric constant of the dielectric layer may be enhanced if the embedded conductive particulates are elongated. In FIG. 3, capacitor 30 includes a first electrode 32, a second electrode 34 and dielectric 36. Dielectric 36 is comprised of a plurality of elongated particulates 38 embedded in a matrix material 37. In the preferred mode, the particulates 38 are aligned in the direction of the electric field between the electrodes 32 and 34, although as shown, the particulates 38 are somewhat randomly oriented with a general orientation that is close to this alignment. The particulates 38 are arranged using any of the methods described below. As with the capacitor 20 of FIG. 2, capacitor 30 may also include insulating layers 31 and 33. In this embodiment, however, high loadings of the particulates 38, increase conductivity in the electrode-electrode direction, greater than the increase of conduction in the lateral direction. This can be important, because it is preferred to have the insulating layers 31 and 33 as thin as possible, to provide a higher capacitance. When these layers are thin, the chance of pin-hole defects (shorts) increases. With two insulating layers, the chance of a pin-hole in each layer aligning with a pin-hole in the other layer is extremely small. Thus, any leakage current through the pin-holes must flow in the more resistive lateral direction, thereby reducing leakage and loss.

Elongated conductive particulates may be produced, for example, according to the methods taught in U.S. Pat. No. 6,090,858, the teachings of which are incorporated herein by reference. Preferably elongated particulates, as used herein, have, on average, a longest (lengthwise) dimension which is at least about twice as great as any dimension orthogonal to such longest dimension. When an electric field is applied to a dielectric material containing such elongated particulates, in those of the elongated particulates for which the lengthwise direction is aligned at least partially in the capacitor plate-to-capacitor plate direction, a dipole is induced by the charged capacitor. In such material, not only is the dielectric constant enhanced, but also the tunability of the capacitor. Elongated particulates might, for example, be distributed throughout a dielectric polymer, either thermoplastic or thermoset to provide the dielectric layer of the capacitor. Likewise, elongated particulates might be distributed throughout an inorganic matrix.

The enhanced dielectric constant and tunability are particularly enhanced if the elongated particulates 38 are predominantly aligned in the capacitor plate-to-capacitor plate direction as is shown in FIG. 3. It is to be understood that not all of the particulates will ever be aligned in the plate-to-plate direction. In a random distribution the ratio of the vectors of the lengthwise dimension of elongated particulate in a plate-to-plate direction relative to the sum of the vectors horizontal to the plates (assuming parallel plates) will be 1:1. Preferably, the orientation of the particulates in the plate-to-plate direction will be enhanced relative to random distribution such that the ratio of the vectors of the lengthwise dimension of elongated particulates in the electrode-to-electrode direction relative to the sum of the vectors lateral (orthogonal to the electrode-to-electrode direction) direction is at least about 1.1:0.9.

A method of aligning elongated particulates 38 in a capacitor plate-to-capacitor plate direction is to subject the dielectric material to a very strong electrical field applied in the plate-to-plate direction. In elongated particulates that are even partially aligned in the direction of the electric field, the dipole will migrate towards the ends of the particulate with charges opposite those of the electric field, and the resulting attraction will tend to cause such particulates to further align. Of course, for the elongated particulates to align, they must be somewhat mobile, at least rotationally, within the dielectric material. Because of the extremely small size of nanoparticulates, they may be mobile even within a solid polymer, whether thermoset or thermoplastic. Almost all polymer dielectrics, whether thermoset or thermoplastic, may have natural interstices, and nanoparticulates are likely to settle in such interstices. If the nanoparticulates are contained within such interstices, and subject to a sufficiently strong electric field, they are likely to align themselves within such interstices in the direction of the applied strong electric field, and wedge themselves permanently in such aligned direction. The same may be true for elongated particulates contained within a porous ceramic material.

Elongated conducting nanoparticulates and particulates of insulating (dielectric) material may be co-sintered together to form dielectric material layers in accordance with the invention. Because the conducting nanoparticulates and insulating material particulates are separately formed, the elongated nanoparticulates are likely to situate in voids in the sintered dielectric material, in which case they may be aligned, as described above, by subjecting the material to a strong electric field. Or, the elongated nanoparticulates might be held in alignment by a strong electric field during formation of the composite material.

If the nanoparticulates are too large relative to polymer interstices of a polymer to align themselves within the polymer when in solid form, it may be necessary to align the particulates while the polymer is at least partially flowing. A thermoplastic polymer may be heated to softening prior to application of the strong electric field that aligns the particulates, or the alignment may be done while such a polymer is at least partially fluid while still having a high solvent content. In a thermoset polymer, electrical alignment of particulates may be performed while the polymer is in an un-cured or partially cured state.

Figure 4:
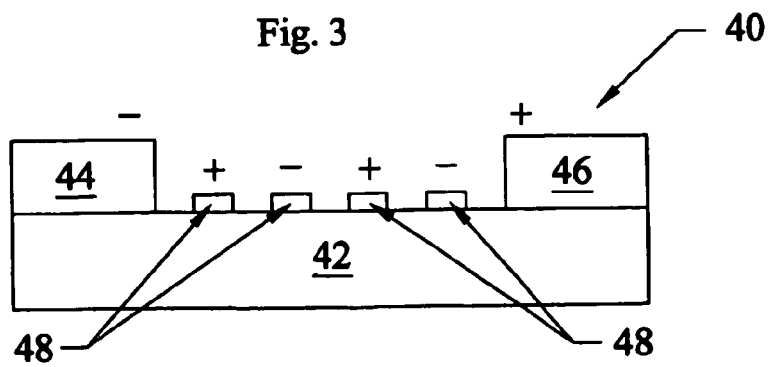
FIG. 4 illustrates an enhanced capacitor.

In FIG. 4, a further embodiment 40 of the capacitor of the present invention is shown. Capacitor 40 includes a dielectric material 42, having a first electrode 44, and a second electrode 46 on top of the dielectric 42. Between the electrodes 44 and 46 are a series of conductive strips 48 that interact with the RF field to increase the effective capacitance. Strips 48 may be electrically isolated, or may be connected (not shown) alternatively to a DC (or low frequency AC) biasing circuit for reasons described below. When a DC potential is applied to the electrodes 46 and 44 as shown by the + and − symbols, a DC voltage is induced in the strips 48 (also as shown by the + and − symbols). The symbols also represent the instantaneous biasing voltage that may be applied to strips 48, should they be connected to a biasing circuit. Alternatively, strips 48 can be provided as a thin single layer between, but separate from, electrodes 44 and 46, to increase the dipoles strength. The main purpose of the conductive strips 48 is to simply enhance the dielectric constant of the now composite material 42.

The dielectric material itself can be a tunable dielectric in this model, wherein the conductive strips can help enhance the tunability of the material. Thus, a material such as barium strontium titanate (BST) or other ferroelectric material could be the dielectric material. The dielectric may be a single material or a layered material. By choosing the proper amount of carriers, the biasing electrodes 48 of a gap capacitor-type form as shown in FIG. 5 could also act as an artificial dielectric that enhances the tunability of the overall structure with the thicker electrodes 44 and 46 on either side being the RF field electrodes and the thin materials 48 in between designating the material that would be tuned. These thin layers 48 in between would be desired to have a high mobility whereby they can be formed as a plate, or strips, as described, creating a similar effect than as elongated rods disposed between the two RF electrodes as per the FIG. 3 embodiment. These plates may also be formed as multi-layers structures to obtain multiple layers of high mobility materials that will interact well with the RF and cause low loss. The substrate material 42 could be a standard dielectric or could be a tunable material such as barium strontium titanate. The top layers 48 could aid in enhancing the tunability of this structure and could even themselves be the biasing electrodes. In the case that it is desired to have enhanced tunability because of the biasing electrodes, rather than use a low mobility material, one would prefer to use a high mobility material. The key would be to limit the number of available charge carriers so the layer thickness is controlled in such a way that when applying maximum tuning voltage available for this circuit, most of the charge carriers within this layer are interacting with the DC bias and therefore become less available or unavailable to the RF field. Interacting with the RF electrodes in this way, they not only perform the tuning of any tunable substrate material 42, but also in themselves contribute fewer dipoles to interact with RF field as the bias is increased. This aspect of the invention is important to all embodiments. The DC bias effect will maximize the RF capacitance change when more of the conductive charge carriers can be constrained by the maximum low frequency or DC bias potential available. Thus, the total amount of charge carriers (conductive material used) available should be optimized to electric field available for control of the effective capacitance.

The following theory, not to be limited is presented to explain the effect. If too few charge carriers are present, the capacitance is not maximized and intermodulation distortions effects from increased RF power levels can dominate. If too many charge carriers are present, then the bias voltage will only "freeze" a portion of the total available charge carriers. Then the effective capacitance change will be similar portion. The desired device has the potential for the bias potential of the system to minimize the availability of 30% to 300% of the charger carriers, preferably 66% to 150% of the charge carriers, and more preferably 91% to 110% of the charge carriers.

In the case of using these as biasing electrodes, there would be alternating positive and negative voltage across the layers with possibly the left electrode 44 being negative and the right electrode 46 being positive and then alternating negative and positive potentials across the structure, (as shown). It could be that both RF electrodes are at the same DC level, in which case there would be an odd number of biasing electrodes. For example, there may be three biasing electrodes, the middle being biased positively, with the two outer strips being negative. The biasing DC field would then extend between these strips 48, with the RF field extending between RF electrodes 44 and 46. This would also have the advantage of allowing floating voltages in the RF circuitry relative to the DC biasing circuit.

The number of strips or plates 48 in the area between the left and right electrodes 44 and 46 could be varied from one plate to multiple strips. In the case of a single plate 48 between the left and right electrodes 44 and 46, the dipole length would be the length of that layer (in the direction between the RF electrodes), and the tunability would be based on the separation between each edge of the thin layer and the RF electrode (DC field length) while the RF field would extend over the whole area between the RF electrodes. In addition to the dielectric layer 42, the strips 48 may be covered either partially or completely by dielectric material on top thereof. This is also true for electrodes 44 and 46.

The electrodes for the various embodiments of this invention may be in any arrangement or orientation. Parallel plate capacitors are commonly formed, as are interdigitated. When using parallel plate capacitors, the biasing electrodes, if used, generally would be parallel to the electrodes. This would enable large capacitance changes with reduced bias potentials and low intermodulation distortion (IMD) effects. In particular, precise thickness of tunable material can be formed between each thin bias layer and the electrodes. Currently such thin tunable dielectrics are not used due to IMD and breakdown. By having multiple dielectric layers, such effects are overcome, and the biasing interlayers enable the desired low biasing potentials.

The invention will now be described in greater detail by way of specific example.

EXAMPLE

A dielectric material layer, 0.345 microns thick comprising 33 mol % Pt and 66 mol % silica was deposited on a Pt-coated silicon substrate. Platinum particulates and silica were co-deposited from separate combustion chemical vapor deposition (CCVD) flames, such CCVD flame deposition being taught in U.S. Pat. No. 5,652,021. A second electrode layer made of silver was formed on the exposed surface of the dielectric layer. The capacitance in picofarads was measured at various biasing voltages. Results are as follows:

| Biasing Voltage | Capacitance |
|---|---|
| 0 | 241.4 |
| 10 | 240.2 |
| 20 | 237.3 |
| 30 | 230.6 |
| 40 | 224.6 |

Those publications referred to in this application are all hereby incorporated by reference in their entirety.

What is claimed is:

1. A capacitor comprising:
   a dielectric material;
   a first electrode on or in said dielectric material;
   a second electrode on or in said dielectric material and spaced from said first electrode; and
   at least one strip of thinner conductive material on or in said dielectric material and between said electrodes, said at least one strip being made of a material that interacts with an RF field from either of said electrodes, to cause an increase in the capacitance of the capacitor.

2. The capacitor of claim 1 wherein said dielectric material comprises a polymeric material matrix and metal nanoparticulates covalently bound within said polymeric matrix.

3. A capacitor comprising a pair of electrodes and, between said electrodes, a dielectric material in accordance with claim 2.

4. The capacitor of claim 1 wherein:
said at least one strip of conductive material comprises one strip of conductive material.

5. The capacitor of claim 1 wherein:
said at least one strip of conductive material comprises a plurality of strips of conductive material.

6. The capacitor of claim 1 wherein:
said plurality of strips of conductive material are alternately attached to positive and negative voltages of a biasing circuit.

7. The capacitor of claim 1 wherein:
said at least one strip of conductive material has a charge carrier mobility that is about $10^4$ cm$^2$/V·s or more.

8. The capacitor of claim 1 wherein:
said at least one strip of conductive material has a charge carrier mobility that is about $10^6$ cm$^2$/V·s or more.

9. The capacitor of claim 1 wherein:
said at least one strip of conductive material is a metal.

10. The capacitor of claim 1 wherein:
said dielectric material is tunable.

11. The capacitor of claim 1 wherein:
said at least one strip of conductive material comprises several layers.

12. The capacitor of claim 1 wherein said electrodes form a parallel plate capacitor.

13. The capacitor of claim 1 wherein said electrodes form a gap capacitor.

14. The capacitor of claim 1 which functions at a biasing voltage of 10 volts or less.

15. The capacitor of claim 1 which functions at a biasing voltage of 3 volts or less.

16. The capacitor of claim 1 wherein said electrodes are made of materials that have electron/hole mobilities of $10^3$ cm$^2$/V·s or less.

17. The capacitor of claim 1 wherein said electrodes are made of materials that have electron/hole mobilities of $10^{-1}$ cm$^2$/V·s or less.

18. The capacitor of claim 1 wherein said at least one strip of thinner conductive material is aligned generally with the electric field.

19. The capacitor of claim 1 wherein said at least one strip of thinner conductive material is aligned generally parallel to the electric field.

* * * * *